(12) United States Patent
Nakayama et al.

(10) Patent No.: US 11,318,718 B2
(45) Date of Patent: May 3, 2022

(54) INTERLAYER FOR LAMINATED GLASS, LAMINATED GLASS, PRODUCTION METHOD FOR EMBOSSING ROLL, AND PRODUCTION METHOD FOR INTERLAYER FOR LAMINATED GLASS

(71) Applicant: SEKISUI CHEMICAL CO., LTD., Osaka (JP)

(72) Inventors: Kazuhiko Nakayama, Shiga (JP); Morimasa Omizu, Shiga (JP); Masaya Kondou, Shiga (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 17/148,069

(22) Filed: Jan. 13, 2021

(65) Prior Publication Data

US 2021/0129501 A1    May 6, 2021

Related U.S. Application Data

(62) Division of application No. 15/554,247, filed as application No. PCT/JP2016/061516 on Apr. 8, 2016, now Pat. No. 10,933,612.

(30) Foreign Application Priority Data

Apr. 10, 2015  (JP) .................. 2015-081180

(51) Int. Cl.
*B32B 17/10* (2006.01)
*B24C 3/32* (2006.01)
(Continued)

(52) U.S. Cl.
CPC .......... *B32B 17/10559* (2013.01); *B24C 3/32* (2013.01); *B24C 11/00* (2013.01);
(Continued)

(58) Field of Classification Search
CPC ... B29C 48/88; B29C 59/04; B29C 2509/027; B24C 3/32; B24C 1/00; B24C 1/006; B24C 1/08
See application file for complete search history.

(56) References Cited

U.S. PATENT DOCUMENTS 5,455,103 A   10/1995   Hoagland et al.
6,093,471 A   7/2000    Hopfe et al.
(Continued)

FOREIGN PATENT DOCUMENTS

AU   2013 297 368   2/2015
CN   101960334      1/2011
(Continued)

OTHER PUBLICATIONS

International Search Report dated Jul. 12, 2016 in International (PCT) Application No. PCT/JP2016/061516.
(Continued)

*Primary Examiner* — Donald J Loney
(74) *Attorney, Agent, or Firm* — Wenderoth, Lind & Ponack, L.L.P.

(57) ABSTRACT

The present invention aims to provide an interlayer film for a laminated glass having recesses in the shape of engraved lines on both surfaces to exhibit excellent deaeration properties in production of a laminated glass and suppressing formation of a moire pattern when unwound from a rolled body thereof. The present invention also aims to provide a laminated glass including the interlayer film for a laminated glass, a method for producing an embossing roll suitably used for production of the interlayer film for a laminated glass, and a method for producing the interlayer film for a laminated glass. The present invention relates to an interlayer film for a laminated glass, having a large number of recesses on both surfaces, the recesses each having a groove shape with a continuous bottom and being regularly adjacent (Continued)

(a)

(b)

and parallel to each other, the interlayer film having a glossiness on a surface with the large number of recesses measured in conformity with JIS Z 8741-1997 of higher than 3% or a haze value measured in conformity with JIS K 7105-1981 of 87% or lower.

3 Claims, 3 Drawing Sheets

(51) Int. Cl.
| | |
|---|---|
| B24C 11/00 | (2006.01) |
| B29C 59/04 | (2006.01) |
| B32B 3/30 | (2006.01) |
| E06B 3/66 | (2006.01) |
| E06B 3/677 | (2006.01) |
| B23P 15/24 | (2006.01) |
| B29C 48/88 | (2019.01) |
| B24C 1/00 | (2006.01) |
| B24C 1/08 | (2006.01) |
| B29K 29/00 | (2006.01) |
| B60J 1/00 | (2006.01) |
| B60J 1/02 | (2006.01) |

(52) U.S. Cl.
CPC ............... B29C 59/04 (2013.01); B32B 3/30 (2013.01); B32B 17/10587 (2013.01); B32B 17/10761 (2013.01); E06B 3/6608 (2013.01); E06B 3/6775 (2013.01); B23P 15/24 (2013.01); B24C 1/00 (2013.01); B24C 1/006 (2013.01); B24C 1/08 (2013.01); B29C 48/88 (2019.02); B29K 2029/14 (2013.01); B32B 2605/006 (2013.01); B60J 1/001 (2013.01); B60J 1/02 (2013.01); Y10T 428/2457 (2015.01)

(56) References Cited

U.S. PATENT DOCUMENTS

| | | | |
|---|---|---|---|
| 6,863,956 B1 | 3/2005 | Nakajima et al. | |
| 2001/0022066 A1* | 9/2001 | Stolz | B24C 3/32 53/560 |
| 2013/0141681 A1 | 6/2013 | Takahashi et al. | |
| 2016/0101602 A1 | 4/2016 | Kitano et al. | |
| 2016/0129674 A1 | 5/2016 | Kitano et al. | |
| 2016/0151995 A1 | 6/2016 | Kitano et al. | |
| 2016/0151996 A1 | 6/2016 | Kitano et al. | |

FOREIGN PATENT DOCUMENTS

| | | |
|---|---|---|
| EP | 0 246 329 | 11/1987 |
| EP | 1 233 077 | 8/2002 |
| EP | 3 202 734 | 8/2017 |
| JP | 61-154919 | 7/1986 |
| JP | 5-147981 | 6/1993 |
| JP | 06-055449 | 3/1994 |
| JP | 07-292133 | 11/1995 |
| JP | 08-026789 | 1/1996 |
| JP | 09-295839 | 11/1997 |
| JP | 10-017338 | 1/1998 |
| JP | 2000-007390 | 1/2000 |
| JP | 2000-290046 | 10/2000 |
| JP | 2000-319045 | 11/2000 |
| JP | 2001-163641 | 6/2001 |
| JP | 2002-037648 | 2/2002 |
| JP | 2002-104846 | 4/2002 |
| JP | 2002-154156 | 5/2002 |
| JP | 2003-048762 | 2/2003 |
| JP | 2007-022089 | 2/2007 |
| JP | 2009-084127 | 4/2009 |
| JP | 2010-523379 | 7/2010 |
| RU | 68504 | 11/2007 |
| WO | 2008/128003 | 10/2008 |
| WO | 2015/016358 | 2/2015 |
| WO | 2015/016361 | 2/2015 |
| WO | 2015/016365 | 2/2015 |
| WO | 2015/016366 | 2/2015 |

OTHER PUBLICATIONS

Partial European Search Report dated Nov. 27, 2018 in European Patent Application. No. 16776678.1.
Extended European Search Report dated Mar. 28, 2019 in corresponding European Patent Application No. 16776678.1.
Machine translation of applicant cited JP 2002-104846. (Year: 2002).
Machine translation of applicant cited JP 2002-037648. (Year: 2002).
Machine translation of applicant cited JP 07-292133. (Year: 1995).
Communication pursuant to Article 94(3) EPC dated Oct. 15, 2021 in European Patent Application No. 16 776 678.1.

* cited by examiner (a)

(b)

(a)

(b)

INTERLAYER FOR LAMINATED GLASS, LAMINATED GLASS, PRODUCTION METHOD FOR EMBOSSING ROLL, AND PRODUCTION METHOD FOR INTERLAYER FOR LAMINATED GLASS

TECHNICAL FIELD

The present invention relates to an interlayer film for a laminated glass having recesses in the shape of engraved lines on both surfaces to exhibit excellent deaeration properties in production of a laminated glass and suppressing formation of a moire pattern when unwound from a rolled body thereof. The present invention also relates to a laminated glass including the interlayer film for a laminated glass, a method for producing an embossing roll suitably used for production of the interlayer film for a laminated glass, and a method for producing the interlayer film for a laminated glass.

BACKGROUND ART

A laminated glass including two glass plates integrated through an interlayer film for a laminated glass containing plasticized polyvinyl butyral is widely used, particularly, for vehicle windshields.

In the process for producing a laminated glass, deaeration properties upon stacking a glass plate and an interlayer film for a laminated glass on top of each other is important. The interlayer film for a laminated glass therefore has fine protrusions and recesses formed on the surface for the purpose of ensuring the deaeration properties in production of a laminated glass. In particular, when the recesses each have a groove shape with a continuous bottom and such recesses are regularly adjacent and parallel to each other (hereafter, also referred to as "recesses in the shape of engraved lines"), remarkably excellent deaeration properties can be exhibited.

In a method for producing a laminated glass, for example, an interlayer film for a laminated glass unwound from a rolled body is cut into an appropriate size, and the resulting interlayer film for a laminated glass is sandwiched between at least two glass plates. The obtained laminate is placed in a rubber bag and vacuum suctioned so that the glass plates and the interlayer film are preliminarily pressure bonded while air remaining therebetween is removed. Then, the laminate is pressurized with heat, for example, in an autoclave for final pressure bonding (e.g., Patent Literature 1).

The interlayer film for a laminated glass having recesses in the shape of engraved lines however suffers a streaky optical interference image called a moire pattern when unwound from a rolled body thereof. The moire pattern formed tires operator's eyes in the production process of a laminated glass including alignment of glass plates and the interlayer film, leading to lower work efficiency.

A moire phenomenon is known to occur in the interlayer film for a laminated glass due to regularly arranged embosses on both surfaces of the interlayer film, and various means for preventing the moire phenomenon have been proposed (see Patent Literatures 2 and 3, for example). A moire pattern that is formed when an interlayer film for a laminated glass having recesses in the shape of engraved lines is unwound from a rolled body thereof is however different in characteristics from conventionally known moire phenomena. For example, it is not observed before the interlayer film is wound into a rolled body and it disappears when heated. Such a moire pattern cannot be prevented by conventionally proposed means.

CITATION LIST

Patent Literature

Patent Literature 1: JP H08-26789 A
Patent Literature 2: JP 2000-7390 A
Patent Literature 3: JP 2000-319045 A

SUMMARY OF INVENTION

Technical Problem

The present invention aims to provide, in consideration of the state of the art, an interlayer film for a laminated glass having recesses in the shape of engraved lines on both surfaces to exhibit excellent deaeration properties in production of a laminated glass and suppressing formation of a moire pattern when unwound from a rolled body thereof. The present invention also aims to provide a laminated glass including the interlayer film for a laminated glass, a method for producing an embossing roll suitably used for production of the interlayer film for a laminated glass, and a method for producing the interlayer film for a laminated glass.

Solution to Problem

The present invention relates to an interlayer film for a laminated glass, having a large number of recesses on both surfaces, the recesses each having a groove shape with a continuous bottom and being regularly adjacent and parallel to each other, the interlayer film having a glossiness on a surface with the large number of recesses measured in conformity with JIS Z 8741-1997 of higher than 3% or a haze value measured in conformity with JIS K 7105-1981 of 87% or lower.

The present invention is specifically described in the following.

The present inventors studied about why an interlayer film for a laminated glass having recesses in the shape of engraved lines after storage as a rolled body suffers a moire pattern when unwound from the rolled body.

The present inventors found out that the moire pattern is caused by a contact between protrusions corresponding to the recesses in the shape of engraved lines when the interlayer film is wound into a rolled body. Specifically, when an interlayer film for a laminated glass having recesses in the shape of engraved lines on both surfaces is wound into a rolled body, protrusions corresponding to the recesses in the shape of engraved lines are made in contact with each other (FIG. 1(a)). Since the rolled body is stressed in the normal direction of the roll core due to a tensile force upon rolling, contact points of the protrusions are deformed. Namely, the shape of engraved lines on one surface of the interlayer film for a laminated glass is transferred to the other surface (FIG. 1(b)). Such a transferred shape of engraved lines on the front surface and the shape of engraved lines on the back surface have the same pitch and angle, so that a moire pattern is presumably formed when light permeates through the interlayer film for a laminated glass unwound from the rolled body.

As a result of further intensive studies, the present inventors found out that when the glossiness on the surface of the interlayer film for a laminated glass is higher than a predetermined value or when the haze value of the interlayer film for a laminated glass is not higher than a predetermined value, formation of a moire pattern when the interlayer film for a laminated glass is unwound from the rolled body can be suppressed. The present invention was thus completed. The moire pattern is presumably reduced by suppressing reduction in the light transmittance due to the pattern of protrusions and recesses because the moire pattern originates from the cyclic rise and fall of the light transmittance on the surface of the film due to the recesses and protrusions.

The interlayer film for a laminated glass of the present invention has a large number of recesses on both surfaces. In the interlayer film for a laminated glass of the present invention, the recesses each have a groove shape with a continuous bottom, and adjacent recesses each having a groove shape with a continuous bottom are regularly parallel to each other. Commonly, ease of deaeration upon pressure bonding of a laminate including an interlayer film for a laminated glass interposed between two glass plates closely relates to the continuousness and smoothness of the bottoms of the recesses. When the recesses are in the shape of engraved lines, the continuousness of the bottoms is further improved to markedly increase the deaeration properties.

The term "regularly parallel" means that adjacent recesses each having the groove shape mentioned above may be parallel to each other at equal intervals, or adjacent recesses in the shape of engraved lines are parallel to each other, but all of adjacent recesses in the shape of engraved lines are not necessarily parallel to each other at equal intervals.

FIG. 2 and FIG. 3 each are a view schematically illustrating an exemplary interlayer film for a laminated glass in which recesses each having a groove shape are parallel to each other at equal intervals. FIG. 4 is a view schematically illustrating an exemplary interlayer film for a laminated glass in which recesses each having a groove shape are parallel to each other at unequal intervals. In FIG. 4, an interval A between a recess 1 and a recess 2 is different from an interval B between the recess 1 and a recess 3. The groove shape does not necessarily have a straight line shape and may be a wave or zigzag, as long as the recesses are regularly adjacent and parallel to each other.

The surface having the recesses has a 75° specular gloss measured in conformity with JIS Z 8741-1997 of higher than 3%. The surface having the recesses with a glossiness of higher than 3% can suppress formation of a moire pattern when the film is unwound from a rolled body thereof. The glossiness is preferably 4% or higher, still more preferably 7% or higher.

Since the recesses in the interlayer film for a laminated glass of the present invention each have a groove shape with a continuous bottom, the glossiness of the interlayer film may be dependent on the irradiation from a light source of a gloss meter. Specifically, the glossiness may change depending on the angle of the groove shape of each recess of the interlayer film for a laminated glass relative to the irradiation direction of the light source. Here, the minimum glossiness obtained by changing the angle of the groove shape of each recess of the interlayer film for a laminated glass relative to the irradiation direction of the light source is preferably used as the glossiness of the interlayer film for a laminated glass of the present invention. In a case where the interlayer film for a laminated glass has the recesses on both surfaces, the glossiness of higher than 3% needs to be achieved on either one surface. For further effective suppression of formation of a moire pattern when the interlayer film for a laminated glass is unwound from a rolled body thereof, the glossiness is preferably higher than 3% on both surfaces.

The glossiness can be measured by the method of measurement 2 described in JIS Z 8741-1997 with a gloss meter (e.g., "GM-26PRO" available from Murakami Color Research Laboratory).

The interlayer film for a laminated glass of the present invention has a haze value measured in conformity with JIS K 7105-1981 of 87% or lower. The interlayer film for a laminated glass with the haze value on the surface having the recesses of 87% or lower can suppress formation of a moire pattern when unwound from a rolled body thereof. The haze value is preferably 84% or lower, more preferably 82% or lower.

The haze value can be measured by the method described in JIS K 7105-1981 with a haze and transmittance meter (e.g., "HM-150" available from Murakami Color Research Laboratory).

The lower limit of the roughness (Rz) of the surface having the recesses is preferably 10 μm, while the upper limit thereof is preferably 65 μm. With the roughness (Rz) of 10 μm or more, remarkably excellent deaeration properties can be exhibited. With the roughness (Rz) of 65 μm or less, a moire phenomenon upon unwinding of the film can be reduced. The lower limit of the roughness (Rz) is more preferably 15 μm, while the upper limit thereof is more preferably 50 μm. The lower limit is still more preferably 25 μm, while the upper limit is still more preferably 40 μm.

The roughness (Rz) of recesses as used herein refers to a ten-point average roughness (Rz) of the obtained interlayer film, determined by a method in conformity with JIS B-0601 (1994) as defined in JIS B-0601 (1994) "Surface roughness—definition and indications". The roughness (Rz) of the recesses can be measured using, for example, a "Surfcorder SE300" available from Kosaka Laboratory Ltd. as a measuring instrument. The measurement is performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The measurement environment is 23° C. and 30 RH %. The stylus is moved in a direction perpendicular to the direction of grooves in the shape of engraved lines.

The recesses on the surface has an interval Sm of preferably 450 μm or less, more preferably 400 μm or less, still more preferably 350 μm or less, particularly preferably 250 μm or less. With such an interval, an autohesion force between faces of the interlayer film for a laminated glass when the interlayer film for a laminated glass is wound into a rolled body is reduced, facilitating unwinding of the film from the rolled body.

Normally, when the Sm is smaller, a moire pattern is more likely to be formed. According to the interlayer film for a laminated glass of the present invention, however, formation of a moire pattern can be suppressed even when the Sm is 450 μm or less, moreover 350 μm or less owing to the glossiness set to exceed the predetermined value.

The interval Sm of the recesses as used herein means the average interval (Sm) of the recesses on the surface of the obtained interlayer film, measured by a method in conformity with JIS B-0601 (1994) as defined in JIS B-0601 (1994) "Surface roughness—definition and indications". The interval Sm of the recesses can be measured using a "Surfcorder SE300" available from Kosaka Laboratory Ltd. as a measuring instrument. The measurement is performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The measurement environment is 23° C. and 30 RH %. The stylus is moved in a direction perpendicular to the direction of grooves in the shape of engraved lines.

In the interlayer film for a laminated glass, the recesses in the shape of engraved lines on one surface and the recesses in the shape of engraved lines on the other surface form an intersection angle θ of preferably 10° or more. With such an intersection angle, an autohesion force between faces of the interlayer film for a laminated glass when the interlayer film for a laminated glass is wound into a rolled body is reduced, facilitating unwinding of the film from the rolled body. The intersection angle θ is more preferably 20° or more, still more preferably 45° or more, particularly preferably 90°. FIG. 6 is a view schematically explaining the intersection angle θ. In FIG. 6, an interlayer film for a laminated glass 10 has recesses 11 each having a groove shape with a continuous bottom illustrated in solid lines on a first surface and recesses 12 each having a groove shape with a continuous bottom illustrated in dotted lines on a second surface. The intersection angle θ refers to an intersection angle formed between the recesses 11 each having a groove shape with a continuous bottom illustrated in solid lines and the recesses 12 each having a groove shape with a continuous bottom illustrated in dotted lines.

The intersection angle θ is measured for example by observing the interlayer film for a laminated glass visually or using an optical microscope. In the case of visual observation, the intersection angle θ between the recesses each having a groove shape with a continuous bottom on the first surface and the recesses each having a groove shape with a continuous bottom on the second surface is measured by drawing in ink straight lines parallel to the recesses on both surfaces and measuring the acute angle formed between the straight lines using a protractor. In the case of using an optical microscope, the intersection angle θ can be measured by photographing the enlarged surface and measuring the acute angle using image processing software.

The top portions of protrusions formed in accordance with the recesses in the shape of engraved lines may each have either a planar shape as illustrated in FIG. 2 or a non-planar shape as illustrated in FIG. 3. In the case where the protrusions each have a planar top portion, fine protrusions and recesses may be further formed on the plane of the top portion.

The protrusions may have either the same height or different heights and the recesses may have either the same depth or different depths as long as the recesses each have a continuous bottom.

For further reduction of the adhesion force (autohesion force) between the interlayer films for a laminated glass stored in the state of being stacked on each other, the radius of rotation R of the protrusions is preferably 120 μm or less, more preferably 100 μm or less, still more preferably 40 μm or less, particularly preferably 25 μm or less. The radius of rotation R of the protrusions is preferably 50 μm or more, more preferably 120 μm or more, still more preferably 200 μm or more, particularly preferably 300 μm or more, because stress is dispersed upon contact of protrusions corresponding to recesses in the shape of engraved lines when the interlayer film for a laminated glass is wound into a rolled body to prevent the shape of engraved lines on one surface from being transferred to the other surface, thereby further suppressing formation of a moire pattern.

The radius of rotation R of each protrusion can be measured as follows. The interlayer film is cut in a direction perpendicular to the direction of the recesses in the shape of engraved lines and in the thickness direction of the film. The cross section is observed using a microscope (e.g., "DSX-100" available from Olympus Corporation) and photographed at a magnification of 277 times. The obtained image is enlarged to 50μ/20 mm for analysis using measurement software included in accessory software. The radius of an inscribed circle at the apex of the protrusion is determined as the radius of rotation of the protrusion. The measurement is performed in an environment at 23° C. and 30 RH %.

FIG. 5(*b*) shows a view schematically explaining the radius of rotation R of the protrusion. In FIG. 5(*b*), the radius of rotation R is a radius of a circle in contact with the tip portion of a protrusion 22.

Any method may be employed to set the glossiness of the surface of the interlayer film for a laminated glass to exceed 3% or set the haze value of the interlayer film for a laminated glass to 87% or lower and to provide recesses in the shape of engraved lines on both surfaces. Preferred is a method including: a first step of providing fine protrusions and recesses to the film surface to set the glossiness of the surface of the interlayer film for a laminated glass to exceed 3% or to set the haze value of the interlayer film for a laminated glass to 87% or lower; and a second step of providing recesses in the shape of engraved lines.

The first step of setting the glossiness of the surface of the interlayer film for a laminated glass to exceed 3% or the haze value of the interlayer film for a laminated glass to 87% or lower is not particularly limited, and is performed by forming fine protrusions and recesses by, for example, an embossing roll method, a calender roll method, a profile extrusion method, or an embossing method in which melt fracture phenomena are controlled. In particular, the first step can be carried out by the following Production Example 1 or Production Example 2.

Production Example 1 is an embossing roll method in which an embossing roll prepared by a specific production method is used. Specifically, an embossing roll is produced by a production process including: a step of forming protrusions and recesses on a metal roll by blasting with an abrasive material (embossing roll production step 1); grinding a portion of each protrusion on the metal roll provided with the protrusions and recesses into a flat surface portion (embossing roll production step 2); and forming protrusions and recesses on the metal roll by blasting with an abrasive material finer than the abrasive material used in the embossing roll production step 1 (embossing roll production step 3). The embossing roll is used to set the glossiness of the surface of the interlayer film for a laminated glass to exceed 3% or to set the haze value to 87% or lower.

The metal roll used in the embossing roll production step 1 is made of a metal such as iron, carbon steel, alloy steel, nickel-chromium steel, or chromium steel. Among these, preferred is a roll made of carbon steel or alloy steel for its excellent durability.

In the embossing roll production step 1, a surface of the metal roll is blasted with an abrasive material made of aluminum oxide, silicon oxide, or the like to form protrusions and recesses on the metal roll surface. In particular, aluminum oxide is suitable as an abrasive material.

The grain size of the abrasive material used in the embossing roll production step 1 is preferably F20 to F120, more preferably F30 to F80 as defined in JIS R6001 (1998).

In the embossing roll production step 1, blasting is performed until desired roughness is obtained, usually at a discharge pressure of $40 \times 10^4$ to $15 \times 10^5$ Pa.

In the embossing roll production step 2, a portion of each protrusion formed on the metal roll in the embossing roll production step 1 is ground (partial grinding) into a flat surface portion. Specifically, the upper portion of each protrusion formed on the metal roll is uniformly ground to be smoothened by the partial grinding. This treatment can eliminate excessively large protrusions on the surface of the metal roll.

Usually, aluminum oxide or silicon carbide of F200 to F220 or #240 to #2000, preferably #400 to #1000 specified in JIS, can be used as a grinding stone for partial grinding in the embossing roll production step 2. Alternatively, sandpaper can be used as a grinding stone.

In the embossing roll production step 3, protrusions and recesses are formed by blasting with an abrasive material finer than the abrasive material used in the embossing roll production step 1.

In the embossing roll production step 3, blasting is performed with an abrasive material made of aluminum oxide, silicon oxide, or the like.

In the embossing roll production step 3, the discharge pressure in the blasting is typically $40 \times 10^4$ to $15 \times 10^5$ Pa.

The grain size of the abrasive material used in the embossing roll production step 3 is preferably F150 to F360 or #240 to #700, more preferably #240 to #400 as defined in JIS R6001 (1998). The use of an abrasive material with such a grain size achieves the desired glossiness or haze value.

The abrasive material used in the embossing roll production step 3 preferably has a grain diameter at a cumulative height of 3% in conformity with JIS R6001 (1998) of 150 μm or less, more preferably 125 μm or less, still more preferably 103 μm or less. The grain diameter at a cumulative height of 3% within the above preferable range enables formation of fine protrusions and recesses on the ground part of the roll, so that the glossiness or haze value of the resulting interlayer film for laminated glass is prevented from being excessively high.

The abrasive material used in the embossing roll production step 3 preferably has a grain diameter at a cumulative height of 94% in conformity with JIS R6001 (1998) of 11 μm or more, more preferably 20 μm or more. With the grain diameter at a cumulative height of 94% within the above preferable range, protrusions and recesses to be formed on the ground part of the roll can have at least a certain size, so that the interlayer film obtained has a high glossiness or haze value.

The abrasive material used in the embossing roll production step 3 preferably has a grain diameter at a cumulative height of 3% in conformity with JIS R6001 (1998) satisfying the above preferable range and a grain diameter at a cumulative height of 94% in conformity with JIS R6001 (1998) satisfying the above preferable range.

The grain size, grain diameter at a cumulative height of 3%, and grain diameter at a cumulative height of 94% are preferably measured by an electrical resistance test method.

The embossing roll may be subjected to metal plating for rust proofing. Particularly preferred is chemical plating because uniform plating thickness can be achieved.

In Production Example 1, the embossing roll produced by the production method is used to set the glossiness of the surface of the interlayer film for a laminated glass to exceed 3% or to set the haze value to 87% or lower by an embossing roll method.

Conditions of the embossing roll method may be as follows: a film temperature of 80° C., an embossing roll temperature of 145° C., a linear velocity of 10 m/min, and a linear pressure within a range of 1 to 100 kN/m.

Production Example 2 is an embossing method in which melt fracture phenomena are controlled. This method adjusts the cooling rate of an interlayer film for a laminated glass formed of a resin composition for forming an interlayer film for a laminated glass after extrusion from a die. In the embossing method in which melt fracture phenomena are controlled, a film extruded from a die is cooled in a cooling water tank. In this operation, the cooling rate of the film can be adjusted to thereby control the glossiness or haze value of a first shape to be formed. Specifically, the first shape satisfying the intended glossiness or haze value can be formed by shortening the distance from the die to the cooling water tank and increasing the cooling rate of the film to increase the value of the glossiness or haze value. The distance between the die and the cooling water tank is preferably 250 mm or shorter, more preferably 200 mm or shorter, still more preferably 150 mm or shorter, particularly preferably 100 mm or shorter, most preferably 50 mm or shorter.

Preferred ranges of other conditions for film formation in Production Example 2 are as follows: an extrusion amount per die width of 100 to 700 kg/hr·m, a surface temperature of the film immediately after extrusion from the die of 140° C. to 260° C., a resin pressure at the die inlet of 30 to 160 kgf/cm², and a water temperature in the water tank for cooling the film of 20° C. to 30° C. Each condition is controlled to achieve the desired extrusion amount and Rz value.

The second step of forming the recesses in the shape of engraved lines is not particularly limited, and is performed by, for example, an embossing roll method, a calender roll method, or a profile extrusion method. In particular, the embossing roll method is preferred because the state where the recesses in the shape of engraved lines are adjacent and parallel to each other can be easily achieved.

The interlayer film for a laminated glass of the present invention may have a single layer structure consisting of one resin layer or a multilayer structure including two or more resin layers laminated together.

In the case of having a multilayer structure, the interlayer film for a laminated glass of the present invention may include, as two or more resin layers mentioned above, a first resin layer and a second resin layer having different characteristics. Such an interlayer film for a laminated glass can have various properties which are hardly achieved by a single layer structure.

The resin layer preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer preferably contains polyvinyl acetal or an ethylene-vinyl acetate copolymer, more preferably contains polyvinyl acetal.

The polyvinyl acetal can be prepared, for example, by acetalization of polyvinyl alcohol with an aldehyde. The polyvinyl alcohol can be produced, for example, by saponification of polyvinyl acetate. The polyvinyl alcohol commonly has a degree of saponification within a range of 70 to 99.8 mol %.

The polyvinyl alcohol has an average degree of polymerization of preferably 200 or more, more preferably 500 or more, still more preferably 1,700 or more, particularly preferably more than 1,700, and preferably 5,000 or less, more preferably 4,000 or less, still more preferably 3,000 or less, particularly preferably less than 3,000. When the average degree of polymerization is equal to or more than the lower limit, a laminated glass to be obtained has higher penetration resistance. When the average degree of polymerization is equal to or less than the upper limit, formation of an interlayer film is facilitated.

The average degree of polymerization of the polyvinyl alcohol can be obtained by the method in conformity with JIS K6726 "Testing methods for polyvinyl alcohol".

The carbon number of an acetal group contained in the polyvinyl acetal is not particularly limited. The aldehyde for use in production of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, an interlayer film has a sufficiently low glass transition temperature, and bleeding out of a plasticizer can be prevented. When the carbon number of the aldehyde is 6 or less, synthesis of the polyvinyl acetal can be facilitated to ensure the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-010 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are propionaldehyde, n-butyraldehyde, isobutyraldehyde, n-hexylaldehyde, and n-valeraldehyde, more preferred are propionaldehyde, n-butyraldehyde, and isobutyraldehyde, and still more preferred is n-butyraldehyde. These aldehydes may be used alone or in combination of two or more thereof.

The hydroxy group content of the polyvinyl acetal is preferably 10 mol % or higher, more preferably 15 mol % or higher, still more preferably 18 mol % or higher, and preferably 40 mol % or lower, more preferably 35 mol % or lower. When the hydroxy group content is equal to or more than the lower limit, an interlayer film has a higher adhesion force. When the hydroxy group content is equal to or less than the upper limit, an interlayer film has high flexibility and is easily handled.

The hydroxy group content of the polyvinyl acetal is a value in percentage of the mole fraction obtained by dividing the amount of ethylene groups to which hydroxy groups are bonded by the total amount of ethylene groups of the main chain. The amount of ethylene groups to which hydroxy groups are bonded can be determined, for example, by measurement in conformity with JIS K6726 "Testing methods for polyvinyl alcohol" or in conformity with ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has high compatibility with a plasticizer. When the degree of acetylation is equal to or less than the upper limit, an interlayer film and a laminated glass to be obtained have high damp resistance.

The degree of acetylation is a value in percentage of the mole fraction obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be measured, for example, in conformity with JIS K6728 "Testing methods for polyvinyl butyral" or in conformity with ASTM D1396-92.

The degree of acetalization of the polyvinyl acetal (or the degree of butyralization of a polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has high compatibility with a plasticizer. When the degree of acetalization is equal to or less than the upper limit, a reaction time necessary for production of the polyvinyl acetal is short.

The degree of acetalization is a value in percentage of the mole fraction obtained by dividing the amount of ethylene groups to which acetal groups are bonded by the total amount of ethylene groups of the main chain.

The degree of acetalization can be calculated by measuring the degree of acetylation and the hydroxy group content by the method in conformity with JIS K6728 "Testing methods for polyvinyl butyral" or the method in conformity with ASTM D1396-92, calculating their mole fractions from the obtained measurement results, and subsequently subtracting the mole fractions of the degree of acetylation and the hydroxy group content from 100 mol %.

The hydroxy group content, the degree of acetalization (degree of butyralization), and the degree of acetylation are preferably calculated from results of measurement by the method in conformity with JIS K6728 "Testing methods for polyvinyl butyral". In the case where the polyvinyl acetal is a polyvinyl butyral resin, the hydroxy group content, the degree of acetalization (degree of butyralization), and the degree of acetylation are preferably calculated from results of measurement by the method in conformity with JIS K6728 "Testing methods for polyvinyl butyral".

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The plasticizer content is not particularly limited. The plasticizer content based on 100 parts by mass of the thermoplastic resin is preferably 25 parts by mass or more, more preferably 30 parts by mass or more, and preferably 80 parts by mass or less, more preferably 70 parts by mass or less. When the plasticizer content is equal to or more than the lower limit, a laminated glass to be obtained has higher penetration resistance. When the plasticizer content is equal to or less than the upper limit, an interlayer film has higher transparency.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The resin layer to be in contact with a glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The thickness of the interlayer film for a laminated glass of the present invention is not particularly limited. The thickness of the interlayer film is preferably 0.1 mm or more, more preferably 0.25 mm or more, and preferably 3 mm or less, more preferably 1.5 mm or less, from a practical standpoint and from the viewpoint of sufficiently enhancing heat shielding properties. When the thickness of the interlayer film is equal to or more than the lower limit, a laminated glass to be obtained has high penetration resistance.

The interlayer film for a laminated glass of the present invention may be produced by any method. A conventionally known method can be employed in production of the interlayer film. For example, a thermoplastic resin and other optional components to be contained, such as the component X, are kneaded and molded into an interlayer film. Extrusion molding is suitable for continuous production and is therefore preferred for production of the interlayer film.

Preferably, the interlayer film for a laminated glass of the present invention includes, as two or more resin layers mentioned above, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is higher than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is lower than the content B, the first resin layer tends to have a higher glass transition temperature than the second resin layer. As a result, the first resin layer is harder than the second resin layer, leading to higher penetration resistance of the interlayer film for a laminated glass.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains polyvinyl acetal X and a plasticizer, and the protective layer contains polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. The sound insulation interlayer film is more specifically described in the following.

In the sound insulation interlayer film, the sound insulation layer imparts sound insulation properties. The sound insulation layer preferably contains the polyvinyl acetal X and a plasticizer.

The polyvinyl acetal X can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, a sound insulation interlayer film to be obtained can have better penetration resistance. When the polyvinyl alcohol has an average degree of polymerization of 5,000 or less, formability of a sound insulation layer can be ensured. Concerning the average degree of polymerization of the polyvinyl alcohol, the lower limit is more preferably 500 and the upper limit is more preferably 4,000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, a sound insulation interlayer film for a laminated glass to be obtained can stably contain a sufficient amount of a plasticizer. As a result, the sound insulation interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or lower, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass.

In the case where the sound insulation layer has a rectangular cross-sectional shape in the thickness direction, the lower limit of the thickness is preferably 50 μm. Having a thickness of 50 μm or more, the sound insulation layer can exhibit enough sound insulation properties. The lower limit of the thickness of the sound insulation layer is more preferably 80 μm. The upper limit thereof is not particularly limited. In consideration of the thickness as an interlayer film for a laminated glass, the upper limit is preferably 300 μm.

The sound insulation layer may have one end and the other end on an opposite side of the one end, and may have a shape in which the thickness of the other end is greater than the thickness of the one end. The sound insulation layer preferably has a wedge portion in a cross-sectional shape in the thickness direction. In this case, the lower limit of the minimum thickness of the sound insulation layer is preferably 50 μm. Having the minimum thickness of 50 μm or more, the sound insulation layer can exhibit enough sound insulation properties. The lower limit of the minimum thickness of the sound insulation layer is more preferably 80 μm, still more preferably 100 μm. The upper limit of the maximum thickness of the sound insulation layer is not particularly limited. The upper limit is preferably 300 μm in consideration of the thickness as an interlayer film for a laminated glass. The upper limit of the maximum thickness of the sound insulation layer is more preferably 220 μm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a higher hydroxy group content than the polyvinyl acetal X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, an interlayer film for a laminated glass to be obtained can have better penetration resistance. When the polyvinyl alcohol has an average degree of polymerization of 5,000 or less, formability of a protective layer can be ensured. Concerning the average degree of polymerization of the polyvinyl alcohol, the lower limit is more preferably 500 and the upper limit is more preferably 4,000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or lower, whitening of an interlayer film for a laminated glass to be obtained can be prevented. When the polyvinyl acetal Y has a hydroxy group content of 28 mol % or more, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of the polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably lower than the plasticizer content of the sound insulation layer.

For higher sound insulation properties of a laminated glass to be obtained, the hydroxy group content of the polyvinyl acetal Y is preferably higher than the hydroxy group content of the polyvinyl acetal X, more preferably higher by 1 mol % or more, still more preferably higher by 5 mol % or more, particularly preferably higher by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content of the sound insulation layer (hereafter, also referred to as content X) based on 100 parts by mass of the polyvinyl acetal X is preferably higher than the plasticizer content of the protective layer (hereafter, also referred to as content Y) based on 100 parts by mass of the polyvinyl acetal Y, more preferably higher by 5 parts by mass or more, still more preferably higher by 15 parts by mass or more, particularly preferably higher by 20 parts by mass or more. Adjustment of the content X and content Y lowers the glass transition temperature of the sound insulation layer. As a result, a laminated glass to be obtained has still higher sound insulation properties.

The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the thickness of the protective layer having a rectangular cross-sectional shape is preferably 100 μm, more preferably 300 μm, still more preferably 400 μm, particularly preferably 450 μm. The upper limit of the thickness of the protective layer is not particularly limited. In order to ensure the thickness of the sound insulation layer enough to achieve sufficient sound insulation properties, the upper limit of the protective layer is practically about 500 μm.

The protective layer may have one end and the other end on an opposite side of the one end, and may have a shape in which the thickness of the other end is greater than the thickness of the one end. The protective layer preferably has a wedge portion in a cross-sectional shape in the thickness direction. The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the minimum thickness of the protective layer is preferably 100 μm, more preferably 300 μm, still more preferably 400 μm, particularly preferably 450 μm. The upper limit of the maximum thickness of the protective layer is not particularly limited. In order to ensure the thickness of the sound insulation layer enough to achieve sufficient sound insulation properties, the upper limit of the protective layer is practically about 1,000 μm, preferably 800 μm.

The interlayer film for a laminated glass of the present invention may have one end and the other end on an opposite side of the one end. The one end and the other end are end portions on both sides facing each other in the interlayer film. In the interlayer film for a laminated glass of the present invention, the thickness of the other end is preferably greater than the thickness of the one end. A laminated glass prepared using the interlayer film for a laminated glass of the present invention having such a shape where the thickness is different between one end and the other end can be suitably used in a head-up display. In this case, occurrence of double images can be effectively suppressed. The interlayer film for a laminated glass of the present invention may have a wedge cross-sectional shape. Provided that the interlayer film for a laminated glass has a wedge cross-sectional shape, a head-up display can perform image display without occurrence of double images by adjusting wedge angle θ of the wedge shape according to the mounting angle of the laminated glass. The lower limit of the wedge angle θ is preferably 0.1 mrad, more preferably 0.2 mrad, still more preferably 0.3 mrad, and the upper limit thereof is preferably 1 mrad, more preferably 0.9 mrad, from the viewpoint of further suppressing the occurrence of double images. In the case of producing the interlayer film for a laminated glass having a wedge cross-sectional shape, for example, by extrusion molding of a resin composition using an extruder, the produced interlayer film may have a shape having the minimum thickness in a region slightly inward from the end on the thinner side (specifically, when the distance from one end to the other end is defined as X, a region within a distance of 0X to 0.2X inward from the end on the thinner side) and having the maximum thickness in a region slightly inward from the end on the thicker side (specifically, when the distance from one end to the other end is defined as X, a region within a distance of 0X to 0.2X inward from the end on the thicker side). Such a shape is herein also included in the wedge shape.

The sound insulation interlayer film may be produced by any method. The sound insulation interlayer film can be produced, for example, by a method of forming the sound insulation layer and protective layer as sheet materials by a conventional film-forming method such as extrusion, calendering, or pressing and then stacking the obtained sheet materials.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Moreover, also usable are organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass having recesses in the shape of engraved lines on both surfaces to exhibit excellent deaeration properties in production of a laminated glass and suppressing formation of a moire pattern when unwound from a rolled body thereof. The present invention also can provide a laminated glass including the interlayer film for a laminated glass, a method for producing an embossing roll suitably used for production of the interlayer film for a laminated glass, and a method for producing the interlayer film for a laminated glass.

DESCRIPTION OF EMBODIMENTS

Figure 1:
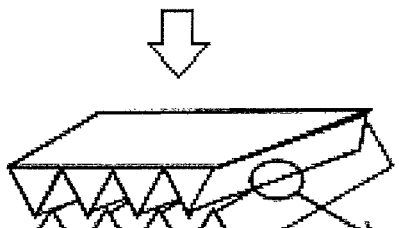
FIG. 1 shows views schematically explaining a cause of a moire pattern formed when an interlayer film for a laminated glass having recesses in the shape of engraved lines is unwound from a rolled body thereof.
Figure 1:
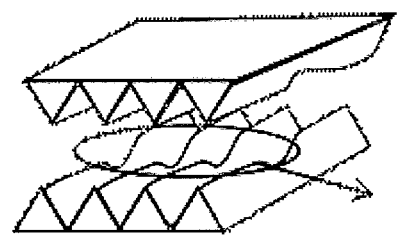
Figure 2:
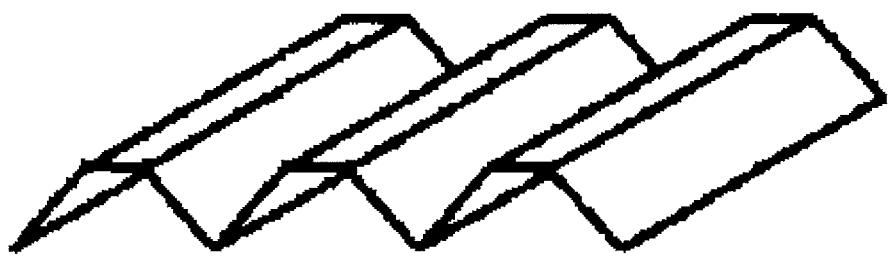
FIG. 2 shows a view schematically illustrating an exemplary interlayer film for a laminated glass in which recesses each having a groove shape with a continuous bottom are arranged on the surface at equal intervals and adjacent recesses are parallel to each other.
Figure 3:
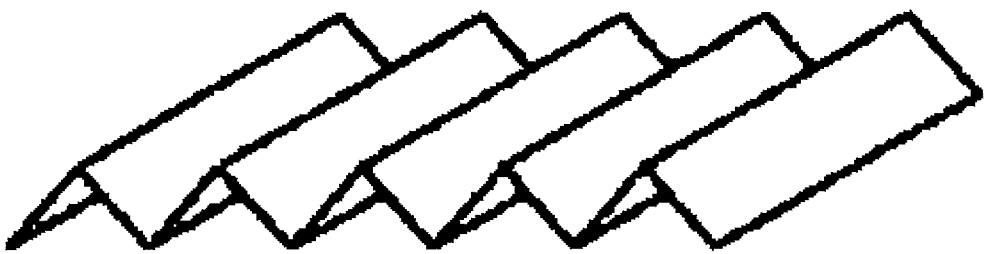
FIG. 3 shows a view schematically illustrating an exemplary interlayer film for a laminated glass in which recesses each having a groove shape with a continuous bottom are arranged on the surface at equal intervals and adjacent recesses are parallel to each other.
Figure 4:
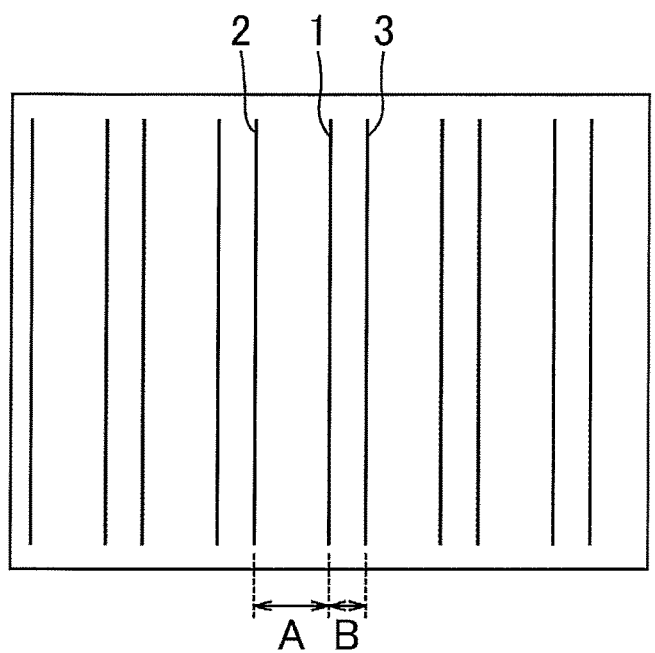
FIG. 4 shows a view schematically illustrating an exemplary interlayer film for a laminated glass in which recesses each having a groove shape with a continuous bottom are arranged on the surface at unequal intervals and adjacent recesses are parallel to each other.
Figure 5:
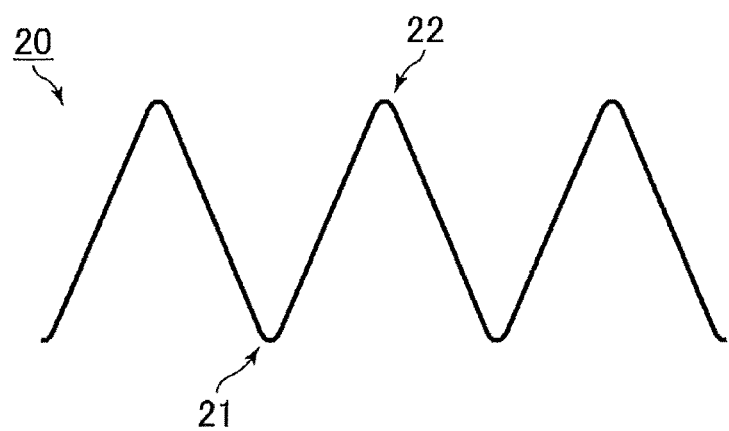
FIG. 5 shows views schematically explaining the radius of rotation R of a protrusion.
Figure 5:
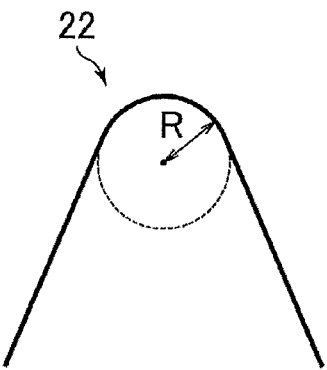
Figure 6:
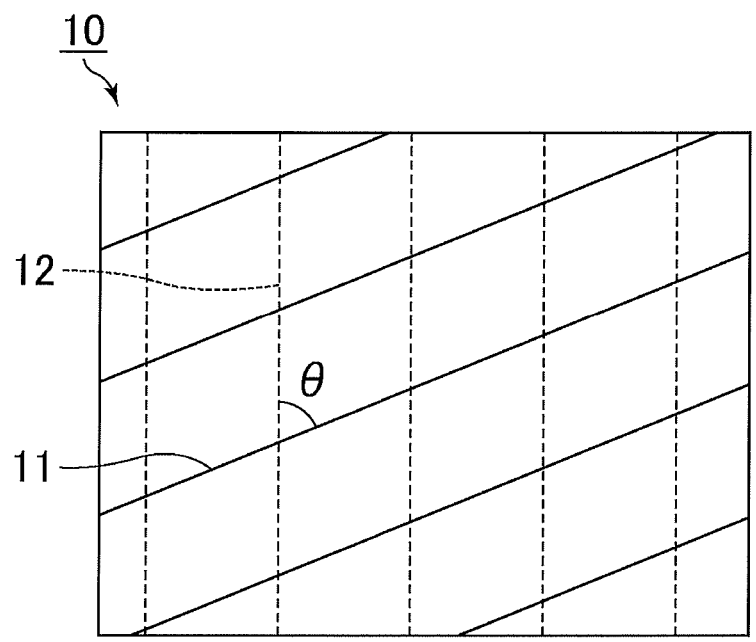
FIG. 6 is a view schematically explaining the intersection angle θ.

Embodiments of the present invention are more specifically described in the following with reference to, but not limited to, examples.

Example 1

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral was added 40 parts by mass of triethylene glycol-di-2-ethylhexanoate (3GO) as a plasticizer, and kneaded well with a mixing roll to give a resin composition.

(2) Production of an Interlayer Film for a Laminated Glass

The obtained resin composition was extruded from an extruder to form an interlayer film for a laminated glass with a uniform thickness.

(3) Formation of Fine Protrusions and Recesses in the First Step

According to Production Example 1, fine protrusions and recesses were formed on both surfaces (first surface and second surface) of the interlayer film for a laminated glass to adjust the glossiness of the surface.

Here, an embossing roll produced by the following method was used.

As an embossing roll production step 1, blasting was performed on the surface of a metal roll using a #36 abrasive material made of aluminum oxide at a discharge pressure of $50 \times 10^4$ Pa. After the embossing roll production step 1, the ten-point average roughness Rz of the roll surface measured in conformity with JIS B-0601 (1994) was 65 µm.

Next, as an embossing roll production step 2, partial grinding was performed using a #400 to #1000 grinding stone. After the embossing roll production step 2, the ten-point average roughness Rz of the roll surface measured in conformity with JIS B-0601 (1994) was 40 μm.

Then, as an embossing roll production step 3, blasting was performed using #320 abrasive material made of aluminum oxide at a discharge pressure of 50×10$^4$ Pa, thereby preparing an embossing roll.

A pair of thus prepared embossing rolls was used as a device for transferring a pattern of protrusions and recesses to form fine protrusions and recesses on both surfaces of the obtained interlayer film for a laminated glass. The transferring conditions employed here were a temperature of the interlayer film for a laminated glass of 80° C., a temperature of the rolls of 145° C., a linear velocity of 10 m/min, a line width of 1.5 m, and a linear pressure of 1 to 100 kN/m.

The ten-point average roughness (Rz) of the film surface after the formation of fine protrusions and recesses measured in conformity with JIS B-0601 was 12 μm. The obtained interlayer film had an average thickness of 760 μm.

(4) Formation of Recesses in the Shape of Engraved Lines by Second Step

To the surface of the interlayer film for a laminated glass after the first step was provided protrusions and recesses each having a groove shape with a continuous bottom by the following procedure. A pair of rolls including a metal roll having a surface processed with a triangular oblique line-type mill and a rubber roll having a JIS hardness of 45 to 75 was used as a device for transferring a pattern of protrusions and recesses. The interlayer film for a laminated glass after the first step was passed through the device for transferring a pattern of protrusions and recesses, thereby forming protrusions and recesses where recesses each having a groove shape with a continuous bottom are parallel to each other at equal intervals on the first surface of the interlayer film for a laminated glass. The transferring conditions employed here were a temperature of the interlayer film for a laminated glass of 70° C., a temperature of the rolls of 140° C., a linear velocity of 10 m/min, and a linear pressure to 1 to 100 kN/m for producing the desired roughness.

Then, the same operations were performed on the second surface of the interlayer film for a laminated glass to form recesses each having a groove shape with a continuous bottom. At that time, the intersection angle formed between the recesses each having a groove shape (shape of an engraved line) with a continuous bottom on the first surface and the recesses each having a groove shape (shape of an engraved line) with a continuous bottom on the second surface was set to 20°.

(5) Measurement of Protrusions and Recesses on the First Surface and the Second Surface (5-1) Glossiness Measurement The glossiness was measured using a gloss meter ("GM-26PRO" available from Murakami Color Research Laboratory) by the method of measurement 2 described in JIS Z 8741-1997. The interlayer film for a laminated glass was left to stand on a sample table, and the glossiness was measured while the interlayer film for a laminated glass was rotated so that the angle of the groove shape of each recess relative to the irradiation direction of a light source was changed. Here, the minimum glossiness was taken as the glossiness of the interlayer film for a laminated glass of the present invention.

(5-2) Rz Value Measurement

The ten-point average roughness (Rz) on both surfaces of the obtained interlayer film for a laminated glass was measured by the method in conformity with JIS B-0601 (1994) using "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The measurement environment was 23° C. and 30 RH %. The stylus was moved in a direction perpendicular to the groove direction of engraved lines.

(5-3) Sm Measurement

The Sm values of the first surface and second surface of the obtained interlayer film for a laminated glass were measured using a "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The measurement environment was 23° C. and 30 RH %. The stylus was moved in a direction perpendicular to the direction of grooves in the shape of engraved lines.

(5-4) Haze Value Measurement

The haze value was measured by the method described in JIS K 7105-1981 with a haze and transmittance meter ("HM-150" available from Murakami Color Research Laboratory). Here the interlayer film for a laminated glass was set in such a manner that the first surface was on the light source side.

Examples 2 to 6

An interlayer film for a laminated glass was obtained in the same manner as in Example 1, except that the conditions for forming recesses in the shape of engraved lines in the second step were changed.

Comparative Example 1

An interlayer film for a laminated glass was obtained in the same manner as in Example 1, except that the grain size of the abrasive material used in the embossing roll production step 3 in which an embossing roll for forming the first shape was produced was changed to #800.

Example 7

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral were added 40 parts by mass of triethylene glycol-di-2-ethylhexanoate (3GO) as a plasticizer, and the mixture was mixed well with a mixing roll to give a resin composition.

(2) Production of an Interlayer Film for a Laminated Glass and Formation of Fine Protrusions and Recesses According to Production. Example 2, concurrently with the formation of an interlayer film for a laminated glass, fine protrusions and recesses were formed on both surfaces of the interlayer film for a laminated glass.

Specifically, an interlayer film for a laminated glass was formed under the conditions including the extrusion amount per die width of 440 kg/hr·m, the surface temperature of the film immediately after extrusion from the die of 200° C., the resin pressure at the die inlet of 80 kgf/cm$^2$, and the water temperature in the water tank for cooling the film of 20° C. to 30° C. in the embossing method in which melt fracture phenomena are controlled, and at the same time, fine protrusions and recesses were formed on both surfaces of the interlayer film for a laminated glass. In the above step, the distance from the die to the surface of the cooling water tank was set to 100 mm.

The obtained interlayer film for a laminated glass had a thickness of 760 μm. The Rz value measured by the same method as in Example 1 after formation of the fine protrusions and recesses was 18 μm.

The obtained interlayer film for a laminated glass with fine protrusions and recesses was subjected to the second step in the same manner as in Example 1, except that the conditions for forming recesses in the shape of engraved lines were changed. An interlayer film for a laminated glass was thus obtained.

Examples 8 to 11

An interlayer film for a laminated glass was obtained in the same manner as in Example 7, except that conditions for forming recesses in the shape of engraved lines were changed.

Comparative Example 2

An interlayer film for a laminated glass was obtained in the same manner as in Example 7, except that the distance from the die to the surface of the cooling water tank was changed to 200 mm in the embossing method in which melt fracture phenomena are controlled.

Examples 12 to 14

An interlayer film for a laminated glass was obtained in the same manner as in Example 1, except that the polyvinyl butyral used had a composition as shown in Table 2 and the conditions for forming the recesses in the shape of engraved lines in the second step were changed.

Comparative Example 3

An interlayer film for a laminated glass was obtained in the same manner as in Comparative Example 1, except that the polyvinyl butyral used had a composition as shown in Table 2 and the conditions for forming the recesses in the shape of engraved lines in the second step were changed.

Comparative Example 4

An interlayer film for a laminated glass was obtained in the same manner as in Comparative Example 2, except that the polyvinyl butyral used had a composition as shown in Table 2 and the conditions for forming the recesses in the shape of engraved lines were changed.

(Evaluation)

Formation of a moire pattern in each of the interlayer films for a laminated glass obtained in Examples 1 to 14 and Comparative Examples 1 to 4 was evaluated by the following method. Tables 1 and 2 show the results.

The interlayer film for a laminated glass obtained in each of the examples and comparative examples was cut to prepare a test sample with a size of 50 mm in length and 50 mm in width. Three pieces of thus obtained test samples were stacked to give a laminate. The laminate was left to stand on a 1.5-mm-thick PVB sheet that was placed on an even glass plate for the purpose of allowing uniform application of a load, with a release paper interposed between the laminate and the PVB sheet. Here, the release paper was prepared by coating base paper with silicone as releasing treatment. Then, a glass plate of 6-kg weight was placed on the laminate with a release paper interposed therebetween. The release paper was prepared by coating base paper with silicone as releasing treatment. After standing at 23° C. for 72 hours, the interlayer film for a laminated glass placed in the middle of the laminate was taken out and subjected to a moire test within three minutes after being taken out.

The moire test was performed as follows. The interlayer film for a laminated glass was set at a position of 1 m from a lamp, and 20 evaluators visually observed the interlayer film from a position on the opposite side of the lamp across the interlayer film and obliquely at an angle of 45°. The number of people who noticed a moire pattern and the number of people who felt that the moire pattern was unpleasant were counted.

TABLE 1

|  |  |  |  | Example | | | | |
|---|---|---|---|---|---|---|---|---|
|  |  |  |  | 1 | 2 | 3 | 4 | 5 |
| Composition of interlayer film | Polyvinyl butyral resin | Average degree of polymerization of PVA | — | 1700 | 1700 | 1700 | 1700 | 1700 |
|  |  | Degree of butyralization | mol % | 69 | 69 | 69 | 69 | 69 |
|  |  | Degree of acetylation | mol % | 1 | 1 | 1 | 1 | 1 |
|  |  | Hydroxy group content | mol % | 30 | 30 | 30 | 30 | 30 |
|  |  | Amount | Parts by mass | 100 | 100 | 100 | 100 | 100 |
|  | Plasticizer | Type | — | 3GO | 3GO | 3GO | 3GO | 3GO |
|  |  | Amount | Parts by mass | 40 | 40 | 40 | 40 | 40 |
| Method of providing fine protrusions and recesses | Melt fracture method | Distance from die to surface of water tank | mm | — | — | — | — | — |
|  | Embossing roll method | Abrasive material used in embossing roll production step 3 | Mesh | #320 | #320 | #320 | #320 | #320 |
| Protrusions and recesses on the surface | First surface | Glossiness | % | 4.2 | 4.9 | 8.0 | 4.9 | 6.5 |
|  |  | Rz | μm | 44 | 35 | 25 | 35 | 37 |
|  |  | Sm | μm | 200 | 200 | 195 | 200 | 260 |
|  | Second surface | Glossiness | % | 4 | 4.5 | 8 | 4.6 | 5.4 |
|  |  | Rz | μm | 42 | 36 | 27 | 36 | 38 |
|  |  | Sm | μm | 185 | 185 | 186 | 185 | 250 |
|  |  | Intersection angle of recesses | ° | 20 | 20 | 20 | 90 | 90 |
|  |  | Haze value | % | 84.4 | 82.9 | 80.0 | 82.8 | 82.5 |

TABLE 1-continued

|  |  |  |  | | | | | |
|---|---|---|---|---|---|---|---|---|
| Evaluation | Moire test | Number of people who noticed moire pattern | | 13 | 10 | 8 | 9 | 7 |
| | | Number of people who felt that moire pattern was unpleasant | | 2 | 0 | 0 | 0 | 0 |

| | | | | Example | | | | |
|---|---|---|---|---|---|---|---|---|
| | | | | 6 | 7 | 8 | 9 | 10 |
| Compositon of interlayer film | Polyvinyl butyral resin | Average degree of polymerization of PVA | — | 1700 | 1700 | 1700 | 1700 | 1700 |
| | | Degree of butyralization | mol % | 69 | 69 | 69 | 69 | 69 |
| | | Degree of acetylation | mol % | 1 | 1 | 1 | 1 | 1 |
| | | Hydroxy group content | mol % | 30 | 30 | 30 | 30 | 30 |
| | | Amount | Parts by mass | 100 | 100 | 100 | 100 | 100 |
| | Plasticizer | Type | — | 3GO | 3GO | 3GO | 3GO | 3GO |
| | | Amount | Parts by mass | 40 | 40 | 40 | 40 | 40 |
| Method of providing fine protrusions and recesses | Melt fracture method | Distance from die to surface of water tank | mm | — | 100 | 100 | 100 | 100 |
| | Embossing roll method | Abrasive material used in embossing roll production step 3 | Mesh | #320 | — | — | — | — |
| Protrusions and recesses on the surface | First surface | Glossiness | % | 15.4 | 10.0 | 10.5 | 3.9 | 7.0 |
| | | Rz | μm | 50 | 35 | 35 | 45 | 49 |
| | | Sm | μm | 395 | 203 | 201 | 201 | 220 |
| | Second surface | Glossiness | % | 14.2 | 11.2 | 11.9 | 3.5 | 7 |
| | | Rz | μm | 45 | 34 | 34 | 43 | 45 |
| | | Sm | μm | 390 | 201 | 201 | 201 | 215 |
| | | Intersection angle of recesses | ° | 20 | 90 | 20 | 20 | 45 |
| | | Haze value | % | 72.0 | 83.2 | 83.3 | 86.2 | 83.3 |
| Evaluation | Moire test | Number of people who noticed moire pattern | | 6 | 14 | 15 | 17 | 8 |
| | | Number of people who felt that moire pattern was unpleasant | | 0 | 2 | 3 | 4 | 0 |

TABLE 2

| | | | | Example | | | |
|---|---|---|---|---|---|---|---|
| | | | | 11 | 12 | 13 | 14 |
| Compositon of interlayer film | Polyvinyl butyral resin | Average degree of polymerization of PVA | — | 1700 | 1700 | 1700 | 1700 |
| | | Degree of butyralization | mol % | 69 | 69 | 69.9 | 68.4 |
| | | Degree of acetylation | mol % | 1 | 1 | 1.1 | 0.7 |
| | | Hydroxy group content | mol % | 30 | 30 | 29 | 30.9 |
| | | Amount | Parts by mass | 100 | 100 | 100 | 100 |
| | Plasticizer | Type | — | 3GO | 3GO | 3GO | 3GO |
| | | Amount | Parts by mass | 40 | 40 | 40 | 40 |
| Method of providing fine protrusions and recesses | Melt fracture method | Distance from die to surface of water tank | mm | 100 | — | — | — |
| | Embossing roll method | Abrasive material used in embossing roll production step 3 | Mesh | — | #320 | #320 | #320 |
| Protrusions and recesses on the surface | First surface | Glossiness | % | 13.9 | 3.5 | 4.4 | 5.0 |
| | | Rz | μm | 43 | 48 | 42 | 35 |
| | | Sm | μm | 350 | 190 | 199 | 195 |
| | Second surface | Glossiness | % | 15 | 3.4 | 4.4 | 4.6 |
| | | Rz | μm | 50 | 48 | 40 | 35 |
| | | Sm | μm | 350 | 175 | 195 | 180 |
| | | Intersection angle of recesses | ° | 20 | 20 | 20 | 20 |
| | | Haze value | % | 79.0 | 86.5 | 83.0 | 82.5 |
| Evaluation | Moire test | Number of people who noticed moire pattern | | 2 | 20 | 13 | 9 |
| | | Number of people who felt that moire pattern was unpleasant | | 0 | 8 | 1 | 0 |

TABLE 2-continued

|  |  |  | | Comparative Example | | | |
|---|---|---|---|---|---|---|---|
|  |  |  |  | 1 | 2 | 3 | 4 |
| Compositon of interlayer film | Polyvinyl butyral resin | Average degree of polymerization of PVA | — | 1700 | 1700 | 1700 | 1700 |
|  |  | Degree of butyralization | mol % | 69 | 69 | 69.9 | 68.4 |
|  |  | Degree of acetylation | mol % | 1 | 1 | 1.1 | 0.7 |
|  |  | Hydroxy group content | mol % | 30 | 30 | 29 | 30.9 |
|  |  | Amount | Parts by mass | 100 | 100 | 100 | 100 |
|  | Plasticizer | Type | — | 3GO | 3GO | 3GO | 3GO |
|  |  | Amount | Parts by mass | 40 | 40 | 40 | 40 |
| Method of providing fine protrusions and recesses | Melt fracture method | Distance from die to surface of water tank | mm | — | 200 | — | 200 |
|  | Embossing roll method | Abrasive material used in embossing roll production step 3 | Mesh | #800 | — | #800 | — |
| Protrusions and recesses on the surface | First surface | Glossiness | % | 3.0 | 2.9 | 2.8 | 2.9 |
|  |  | Rz | μm | 50 | 53 | 52 | 51 |
|  |  | Sm | μm | 200 | 195 | 200 | 195 |
|  | Second surface | Glossiness | % | 3 | 2.9 | 2.5 | 2.9 |
|  |  | Rz | μm | 52 | 51 | 54 | 51 |
|  |  | Sm | μm | 198 | 203 | 195 | 186 |
|  |  | Intersection angle of recesses | ° | 20 | 20 | 20 | 20 |
|  |  | Haze value | % | 87.8 | 88.1 | 88.0 | 87.9 |
| Evaluation | Moire test | Number of people who noticed moire pattern |  | 20 | 20 | 20 | 20 |
|  |  | Number of people who felt that moire pattern was unpleasant |  | 18 | 17 | 18 | 14 |

Example 15

(Preparation of a Resin Composition for a Protective Layer)

Polyvinyl alcohol having an average degree of polymerization of 1,700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral was added 36 parts by mass of triethylene glycol-di-2-ethylhexanoate (3GO) as a plasticizer, and the mixture was sufficiently kneaded with a mixing roll to prepare a resin composition for a protective layer.

(Preparation of a Resin Composition for an Intermediate Layer)

Polyvinyl alcohol having an average degree of polymerization of 3,000 was acetalized with n-butyraldehyde to give polyvinyl butyral (acetyl group content: 12.5 mol %, butyral group content: 64.2 mol %, hydroxy group content: 23.3 mol %). To 100 parts by mass of the polyvinyl butyral was added 76.5 parts by mass of triethylene glycol-di-2-ethylhexanoate (3GO) as a plasticizer, and the mixture was sufficiently kneaded with a mixing roll to prepare a resin composition for an intermediate layer.

(Production of an Interlayer Film for a Laminated Glass)

The obtained resin composition for an intermediate layer and resin composition for a protective layer were co-extruded using a co-extruder to form an interlayer film for a laminated glass having a triple layer structure including a first protective layer made of the resin composition for a protective layer, an intermediate layer made of the resin composition for an intermediate layer, and a second protective layer made of the resin composition for a protective layer, stacked in the stated order. The extrusion conditions were set such that the first and second protective layers each had a thickness of 350 μm and the intermediate layer had a thickness of 100 μm in an interlayer film for a laminated glass to be obtained after formation of protrusions and recesses.

Then, the protrusions and recesses were formed on the interlayer film for a laminated glass in the same manner as in Example 1, except that the type of the blasting material used in the embossing roll production step 3 in which the embossing roll for forming the first shape was produced was changed and the pressure upon transferring the pattern of protrusions and recesses was adjusted so that the desired Rz value was achieved. The protrusions and recesses on the both surfaces were measured.

Example 16

(Production of an Interlayer Film for a Laminated Glass and Formation of Fine Protrusions and Recesses)

A resin composition for an intermediate layer and a resin composition for a protective layer were obtained in the same manner as in Example 15. The obtained resin composition for, intermediates layer and resin composition for a protective layer were coextruded using a co-extruder to form an interlayer film for a laminated glass having a triple layer structure including a first protective layer made of the resin composition for a protective layer, an intermediate layer made of the resin composition for an intermediate layer, and a second protective layer made of the resin composition for a protective layer, stacked in the stated order. In that process, according to Production Example 2, the first shape was provided concurrently with the formation of the interlayer film for a laminated glass. Specifically, in the embossing method in which melt fracture phenomena are controlled, an interlayer film for a laminated glass was formed under the conditions including the extrusion amount per width of the die of 440 kg/hr·m, the surface temperature of the film immediately after extrusion from the die of 200° C., the resin pressure at the die inlet of 80 kgf/cm², and the water temperature in the water tank for cooling the film of 20° C. to 30° C. At the same time, fine protrusions and recesses were formed on both surfaces of the interlayer film for a laminated glass. In the above step, the distance from the die to the surface of the cooling water tank was set to 100 mm. The obtained interlayer film for a laminated glass with fine protrusions and recesses was subjected to the second step in the same manner as in Example 1, except that the conditions for forming the recesses in the shape of engraved lines were changed. An interlayer film for a laminated glass was thus obtained. The first protective layer and second protective layer of the obtained interlayer film for a laminated glass each had a thickness of 350 μm and the intermediate layer had a thickness of 100 μm.

Examples 17 to 21

An interlayer film for a laminated glass was produced in the same manner as in Example 15, except that the polyvinyl butyral used had a composition as shown in Table 3 or 4 and that the type of the blasting material used in the embossing roll production step 3 in which an embossing roll for forming the first shape was produced and the pressure upon transferring of the pattern of protrusions and recesses were adjusted so that the desired Rz value was achieved. The protrusions and recesses on each surface of the obtained interlayer film for a laminated glass were measured.

Comparative Example 5

An interlayer film for a laminated glass was obtained in the same manner as in Example 15, except that the grain size of the abrasive material used in the embossing roll production step 3 in which an embossing roll for forming the first shape was produced was changed to #800.

Comparative Example 6

An interlayer film for a laminated glass was obtained in the same manner as in Example 16, except that the distance from the die to the surface of the cooling water tank in the embossing method in which melt fracture phenomena are controlled was changed to 200 mm.

(Evaluation)

Formation of a moire pattern in each of the interlayer films for a laminated glass obtained in Examples 15 to 21 and Comparative Examples 5 and 6 was evaluated by the same method as described above. Tables 3 and 4 show the results.

TABLE 3

| | | | | Example | | | | |
|---|---|---|---|---|---|---|---|---|
| | | | | 15 | 16 | 17 | 18 | 19 |
| First and second protective layers | Polyvinyl butyral resin | Average degree of polymerization of PVA | — | 1700 | 1700 | 1700 | 1700 | 1700 |
| | | Degree of butyralization | mol % | 69 | 69 | 69 | 69.9 | 69.9 |
| | | Degree of acetylation | mol % | 1 | 1 | 1 | 1.1 | 1.1 |
| | | Hydroxy group content | mol % | 30 | 30 | 30 | 29 | 29 |
| | | Amount | Parts by mass | 100 | 100 | 100 | 100 | 100 |
| | Plasticizer | Type | — | 3GO | 3GO | 3GO | 3GO | 3GO |
| | | Amount | Parts by mass | 36 | 36 | 36 | 39 | 39 |
| | Structure | Thickness | μm | 350 | 350 | 350 | 350 | 350 |
| Intermediate layer | Polyvinyl butyral resin | Average degree of polymerization of PVA | — | 3000 | 3000 | 1700 | 2300 | 3000 |
| | | Degree of butyralization | mol % | 64.2 | 64.2 | 64.2 | 77.8 | 77.8 |
| | | Degree of acetylation | mol % | 12.5 | 12.5 | 12.5 | 1.5 | 1.5 |
| | | Hydroxy group content | mol % | 23.3 | 23.3 | 23.3 | 20.7 | 20.7 |
| | | Amount | Parts by mass | 100 | 100 | 100 | 100 | 100 |
| | Plasticizer | Type | — | 3GO | 3GO | 3GO | 3GO | 3GO |
| | | Amount | Parts by mass | 76.5 | 76.5 | 76.5 | 79 | 79 |
| | Structure | Thickness | μm | 100 | 100 | 100 | 100 | 100 |
| Whole interlayer film | Structure | Structure | — | First protective layer/intermediate layer/second protective layer | First protective layer/intermediate layer/second protective layer | First protective layer/intermediate layer/second protective layer | First protective layer/intermediate layer/second protective layer | First protective layer/intermediate layer/second protective layer |
| | | Thickness | μm | 800 | 800 | 800 | 800 | 800 |
| Method of providing fine protrusions and recesses | Melt-fracture method | Distance from die to surface of water tank | mm | — | 100 | — | — | — |
| | Embossing roll method | Abrasive material in embossing roll production step 3 | Mesh | #320 | — | #320 | #320 | #320 |

TABLE 3-continued

|  |  |  |  | Example | | | | |
|---|---|---|---|---|---|---|---|---|
|  |  |  |  | 15 | 16 | 17 | 18 | 19 |
| Protrusions and recesses on surface | First surface | Glossiness | % | 4.2 | 9.8 | 4.1 | 4.5 | 4.3 |
|  |  | Rz | μm | 43 | 34 | 4.2 | 42 | 43 |
|  |  | Sm | μm | 200 | 200 | 201 | 204 | 202 |
|  | Second surface | Glossiness | % | 4.3 | 10.6 | 4.4 | 4.5 | 4.4 |
|  |  | Rz | μm | 40 | 37 | 41 | 42 | 42 |
|  |  | Sm | μm | 195 | 198 | 194 | 204 | 200 |
|  | Intersection angle of recesses | | ° | 20 | 90 | 20 | 20 | 20 |
|  | Haze value | | % | 84.6 | 83.4 | 84.5 | 83.5 | 83.4 |
| Evaluation | Moire test | Number of people who noticed moire pattern | | 14 | 16 | 14 | 13 | 13 |
|  |  | Number of people who felt that moire pattern was unpleasant | | 2 | 2 | 2 | 1 | 1 |

TABLE 4

|  |  |  |  | Example | | Comparative Example | |
|---|---|---|---|---|---|---|---|
|  |  |  |  | 20 | 21 | 5 | 6 |
| First and second protective layers | Polyvinyl butyral resin | Average degree of polymerization of PVA | — | 1700 | 1700 | 1700 | 1700 |
|  |  | Degree of butyralization | mol % | 68.5 | 68.5 | 69 | 69 |
|  |  | Degree of acetylation | mol % | 0.5 | 0.5 | 1 | 1 |
|  |  | Hydroxy group content | mol % | 31 | 31 | 30 | 30 |
|  |  | Amount | Parts by mass | 100 | 100 | 100 | 100 |
|  | Plasticizer | Type | — | 3GO | 3GO | 3GO | 3GO |
|  |  | Amount | Parts by mass | 36 | 36 | 36 | 36 |
|  | Structure | Thickness | μm | 350 | 350 | 350 | 350 |
| Intermediate layer | Polyvinyl butyralresin | Average degree of polymerization of PVA | — | 3000 | 1700 | 3000 | 3000 |
|  |  | Degree of butyralization | mol % | 67 | 67 | 64.2 | 64.2 |
|  |  | Degree of acetylation | mol % | 8 | 8 | 12.5 | 12.5 |
|  |  | Hydroxy group content | mol % | 25 | 25 | 23.3 | 23.3 |
|  |  | Amount | Parts by mass | 100 | 100 | 100 | 100 |
|  | Plasticizer | Type | — | 3GO | 3GO | 3GO | 3GO |
|  |  | Amount | Parts by mass | 75 | 75 | 76.5 | 76.5 |
|  | Structure | Thickness | μm | 100 | 100 | 100 | 100 |
| Whole interlayer film | Structure | Structure | — | First protective layer/ intermediate layer/second protective layer | First protective layer/ intermediate layer/second protective layer | First protective layer/ intermediate layer/second protective layer | First protective layer/ intermediate layer/second protective layer |
|  |  | Thickness | μm | 800 | 800 | 800 | 800 |
| Method of providing fine protrusions and recesses | Melt-fracture method | Distance from die to surface of water tank | mm | — | — | — | 200 |
|  | Embossing roll method | Abrasive material in embossing roll production step 3 | Mesh | #320 | #320 | #800 | — |
| Protrusions and recesses on surface | First surface | Glossiness | % | 5.5 | 5.5 | 3.0 | 2.9 |
|  |  | Rz | μm | 33 | 34 | 50 | 53 |
|  |  | Sm | μm | 190 | 188 | 200 | 195 |
|  | Second surface | Glossiness | % | 5.3 | 5.2 | 2.9 | 2.9 |
|  |  | Rz | μm | 35 | 34 | 51 | 53 |
|  |  | Sm | μm | 185 | 180 | 198 | 203 |
|  | Intersection angle of recesses | | ° | 20 | 20 | 20 | 20 |
|  | Haze value | | % | 82.5 | 82.5 | 87.5 | 88.1 |
| Evaluation | Moire test | Number of people who noticed moire pattern | | 8 | 8 | 20 | 20 |
|  |  | Number of people who felt that moire pattern was unpleasant | | 0 | 0 | 16 | 18 |

INDUSTRIAL APPLICABILITY

The present invention can provide an interlayer film for a laminated glass having recesses in the shape of engraved lines on both surfaces to exhibit excellent deaeration properties in production of a laminated glass and suppressing formation of a moire pattern when unwound from a rolled body thereof. The present invention can also provide a laminated glass including the interlayer film for a laminated glass, a method for producing an embossing roll suitably used for production of the interlayer film for a laminated glass, and a method for producing the interlayer film for a laminated glass.

REFERENCE SIGNS LIST

1: Arbitrarily selected one recess
2: Recess adjacent to the arbitrarily selected one recess
3: Recess adjacent to the arbitrarily selected one recess
A: Interval between recess 1 and recess 2
B: Interval between recess 1 and recess 3
10: Interlayer film for a laminated glass
11: Recess having a groove shape with a continuous bottom on first surface
12: Recess having a groove shape with a continuous bottom on second surface
20: Protrusions and recesses on first surface or second surface
21: Recess having a groove shape with a continuous bottom
22: protrusion

The invention claimed is:

1. A method for producing an embossing roll, comprising:
   an embossing roll production step 1 of forming protrusions and recesses on a metal roll by blasting with an abrasive material;
   an embossing roll production step 2 of grinding a portion of each protrusion on the metal roll provided with the protrusions and recesses into a flat surface portion; and
   an embossing roll production step 3 of forming protrusions and recesses by blasting with an abrasive material finer than the abrasive material used in the embossing roll production step 1,
   wherein a grain size of the abrasive material used in the embossing roll production step 3 is F150 to F360 or #240 to #700 as defined in JIS R6001 (1998).

2. The method for producing an embossing roll according to claim 1,
   wherein the abrasive material used in the embossing roll production step 3 has a grain diameter at a cumulative height of 3% in conformity with JIS R6001 (1998) of 150 μm or less and a grain diameter at a cumulative height of 94% in conformity with JIS R6001 (1998) of 11 μm or more.

3. The method for producing an embossing roll according to claim 1,
   wherein the grain size of the abrasive material used in the embossing roll production step 3 is #240 to #400 as defined in JIS R6001 (1998).

* * * * *